United States Patent [19]

Clover, deceased et al.

[11] 4,025,807
[45] May 24, 1977

[54] ELECTROMAGNETIC MOTOR

[76] Inventors: Leonard W. Clover, deceased, late of San Jose, Calif.; by Grace Clover, administratrix, 19759 Douglas Ave., Saratoga, Calif. 95070

[22] Filed: Jan. 26, 1976

[21] Appl. No.: 652,498

[52] U.S. Cl. .................................................. 310/46
[51] Int. Cl.² ........................................ H02K 37/00
[58] Field of Search .................... 310/46, 156, 154

[56] References Cited

UNITED STATES PATENTS

| | | | |
|---|---|---|---|
| 1,863,294 | 6/1932 | Bogia | 310/46 |
| 2,279,690 | 4/1942 | Lindsey | 310/46 |
| 3,331,973 | 7/1967 | McClure | 310/46 |
| 3,396,296 | 8/1968 | Esters | 310/46 |
| 3,426,224 | 2/1969 | Esters | 310/46 |
| 3,710,158 | 1/1973 | Bachle et al. | 310/156 |

*Primary Examiner*—Donovan F. Duggan
*Attorney, Agent, or Firm*—Paul B. Fihe

[57] ABSTRACT

An electromagnetic motor including a rotor having a plurality of permanent magnets on its periphery and a stator closely encompassing the rotor and having a plurality of intervening permanent magnets and electromagnets positioned for interaction with the rotor magnets, the electromagnets being cyclically energized to exert forces on the rotor to effect advance thereof in a predetermined direction.

5 Claims, 6 Drawing Figures

Fig_2

ELECTROMAGNETIC MOTOR

FIELD OF THE INVENTION

The present invention relates generally to electromagnetic motors and more particularly to a motor utilizing permanent magnets as a source of rotary power.

BACKGROUND OF THE INVENTION

A number of motors and other electromagnetic devices have utilized permanent magnets together with electromagnets combined in a fashion to provide output rotary power. However, various problems have been encountered such as the moving contact problem when an electromagnet on a rotor must be supplied with appropriate amounts of current. The major difficulty in all such devices prior to the present invention, however, has been that of efficiency; that is, a relatively large amount of electrical power input was required to produce a given amount of rotary power or torque.

SUMMARY OF THE PRESENT INVENTION

Accordingly, it is the primary objective of the present invention to provide an electromagnetic motor which, through utilization of permanent magnets in both its stator and rotor, simplifies construction and at the same time provides an extremely efficient arrangement. In general terms, such objective is achieved by providing an electromagnetic motor having a hollow stator which closely encompasses a rotor. At angularly-spaced positions, the rotor mounts a plurality of permanent magnets whose poles are exposed at the outer periphery of the rotor and are accordingly in close proximity to the surrounding stator structure. In turn, the stator also mounts a plurality of permanent magnets at predetermined angularly-spaced positions so that their separate poles cyclically come into alignment with the permanent magnets, to exert magnetic attractive or repulsive forces. Such forces act at certain rotative positions of the rotor to exert a sum total of forces in a forward direction, which is that desired for motor operation. However, in other positions, the sum total of magnetic forces by the permanent magnets will urge the rotor in the opposite backward direction and, at such positions in accordance with the present invention, certain electromagnets also positioned on the stator at predetermined positions are energized so as to exert magnetic forces in a forward direction in an amount equal to or in excess of the forces in the backward direction, thus allowing the rotor to continue to revolve in the desired forward direction of motion to provide the ultimate rotary force output or torque.

To assure the desired timing of the actuation of the electromagnets, the rotor mounts at the end of its supporting shaft, a timing disk which couples input electrical energy to such electromagnets at the desired time. Thus, whatever the speed of motor rotation, the desired timing of the electromagnetic actuation is assured.

Control of the rotative speed is achieved by the simple adjustment of the power supplied to the electromagnets, and a simple switch will obviously allow the motor to be turned "on" or "off". The electromagnets are also positioned at appropriate angular intervals on the stator differing from the angular intervals of the rotor magnets so that regardless of the instantaneous rotor disposition when the motor is turned "on", one or more of the electromagnets will be energized to initiate rotation of the rotor in the desired forward direction.

While not essential, it is also preferred in the interest of achieving maximum efficiency to provide a low temperature environment for the stator and rotor, thus to provide superconductivity in a fashion now well known in the field of physics.

BRIEF DESCRIPTION OF THE DRAWINGS

The stated objective of the invention and the manner in which it is achieved as summarized hereinabove will be more readily understood by reference to the following detailed description of an exemplary embodiment of the invention shown in the accompanying drawings wherein.

DETAILED DESCRIPTION OF THE EXEMPLARY EMBODIMENT OF THE INVENTION

Figure 1:
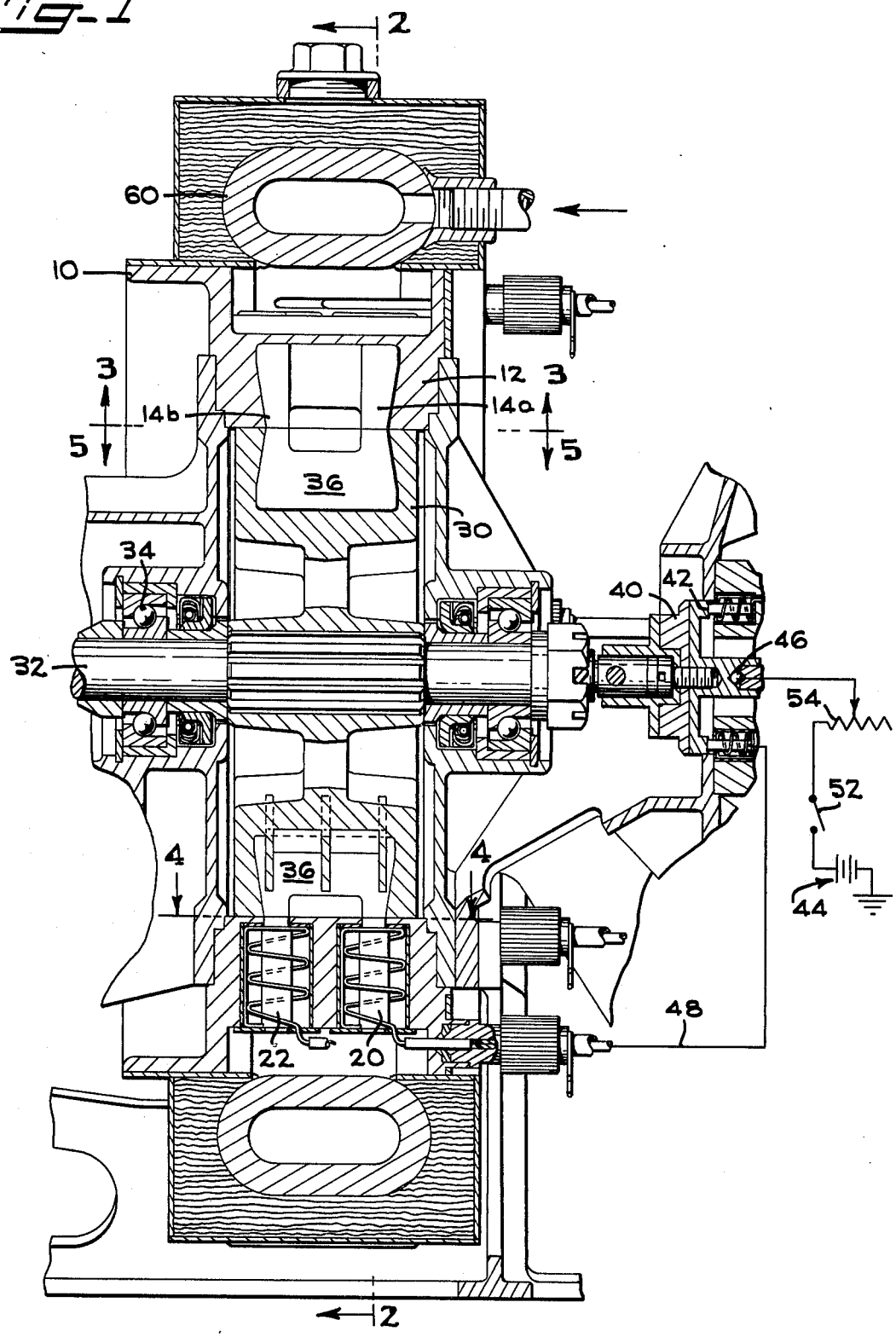
FIG. 1 is a central longitudinal sectional view through an electromagnetic motor embodying the present invention.
Figure 2:
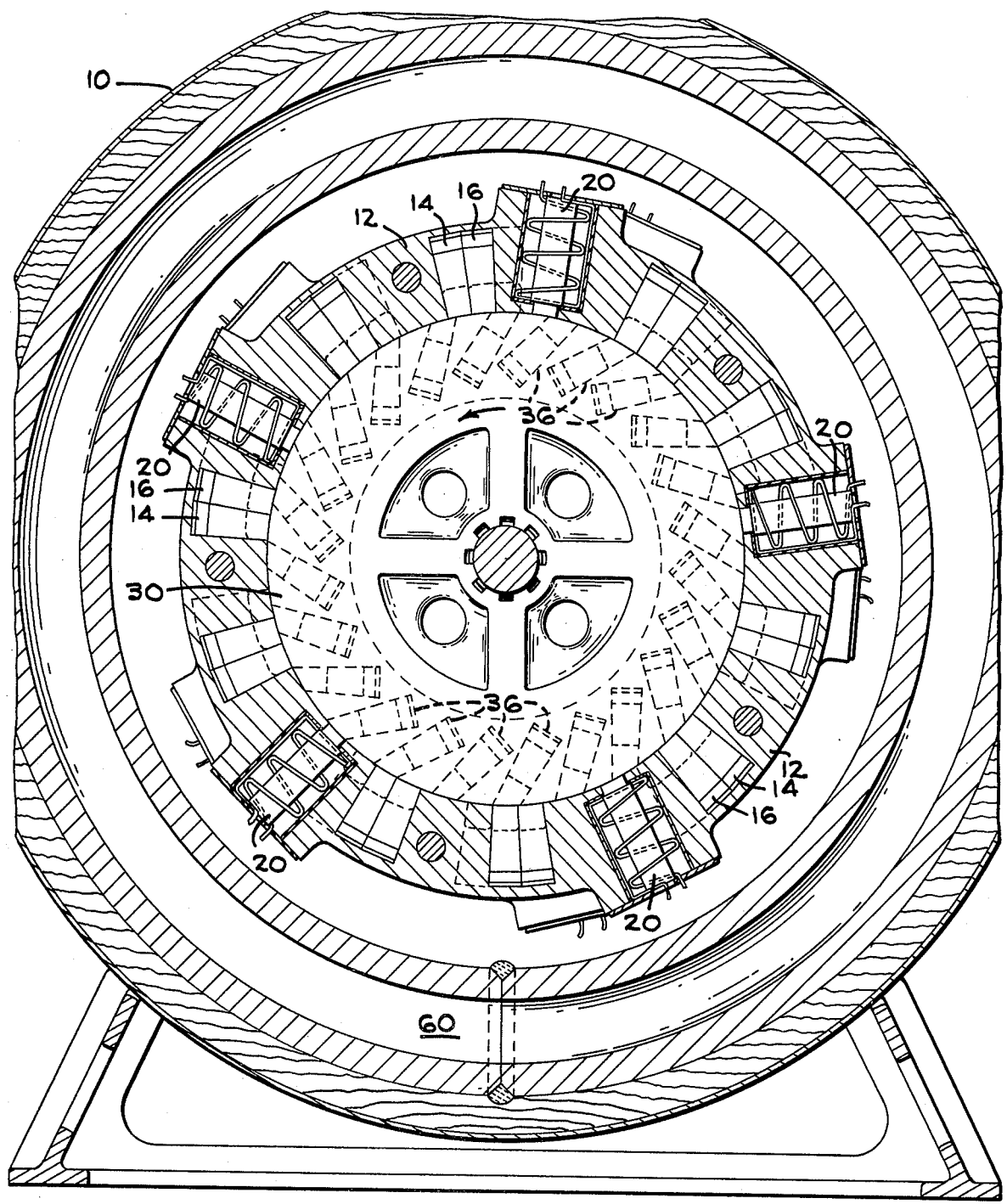
FIG. 2 is a fragmentary transverse cross-sectional view taken along line 2—2 of FIG. 1.
Figure 3:
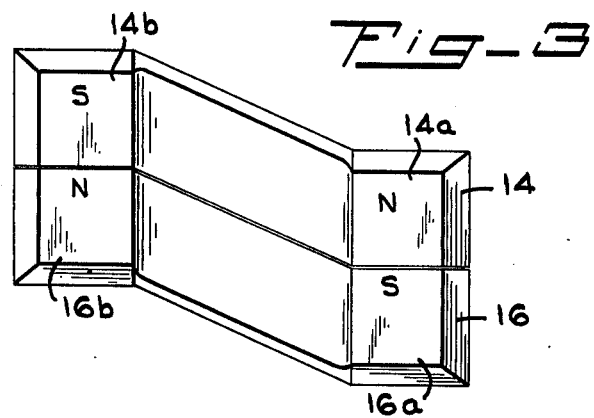
FIG. 3 is a fragmentary transverse sectional view taken along line 3—3 of FIG. 1 indicating the disposition of the pole pieces of the permanent magnets of the stator.
Figure 4:
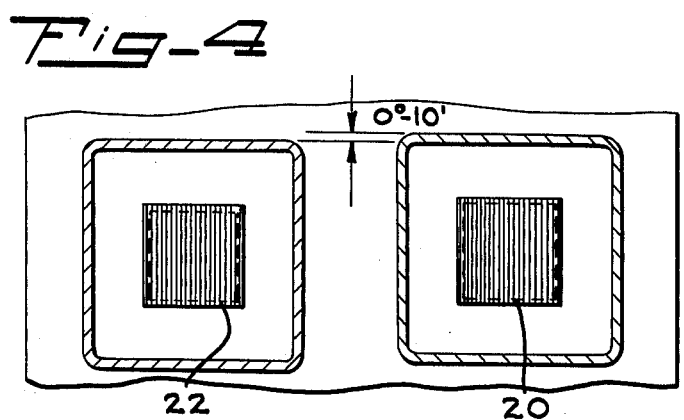
FIG. 4 is another fragmentary transverse sectional view taken along line 4—4 of FIG. 1 illustrating the disposition of the pole pieces of a pair of electromagnets in the stator.
Figure 5:
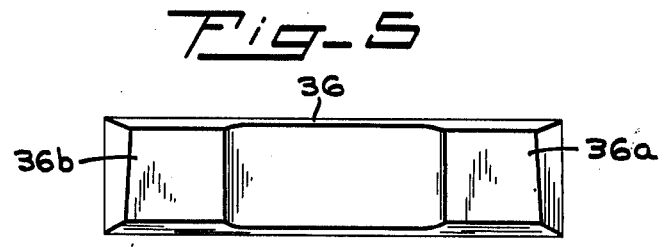
FIG. 5 is yet a third transverse sectional fragmentary view taken along line 5—5 of FIG. 1 indicating the disposition of the pole pieces of the permanent magnets in the rotor structure.

With initial reference to FIGS. 1 and 2, the electromagnetic motor embodying the present invention includes a generally annular housing 10 formed to support adjacent its interior periphery a generally cylindrical stator structure 12 which mounts at 36° angular intervals a plurality of pairs of closely adjacent permanent horseshoe magnets 14, 16 in a fashion so that the exposed poles 14a, 14b, 16a, 16b of the magnets lie at the interior surface of the cylindrical stator 12 in laterally-spaced and rotationally offset relationship as best illustrated in FIG. 3. More particularly, the pairs of horseshoe magnets 14, 16 are in closely adjacent relationship but with reverse polarity, preferably separated angularly by an air gap of 10 minutes so that a cancellation of magnetic force exists therebetween in a rotary direction. The permanent magnets 14, 16 in the stator 12 have their poles rotationally offset a distance equivalent to the length of one pole so that the North poles of the oppositely positioned permanent magnet pairs are laterally aligned in a radial plane encompassing the axial center of the stator 12 so that the one South pole is in advance of the laterally-aligned North poles and the South pole of the other permanent magnet lies behind the laterally-aligned North poles in the direction of rotation.

Figure 6:
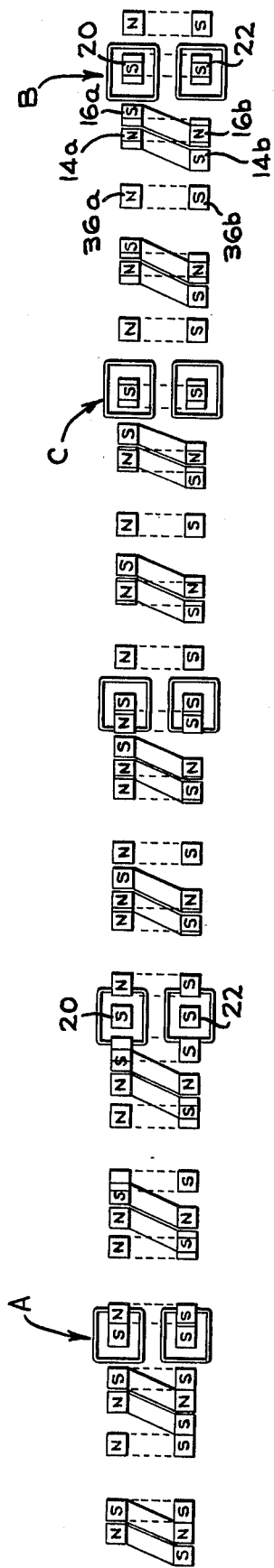
FIG. 6 is a diagrammatic linear projection of the stator and rotor magnets illustrating their precise positional relationships at a predetermined instant, thus facilitating explanation of motor operation.

At intervening positions, five pairs of laterally-spaced single-pole electromagnets 20, 22, all of the same South polarity, are disposed at 72° intervals with five poles of electromagnets 20 being circularly aligned with the poles 14a, 16a of the permanent magnets 14, 16 and the other five poles of the electromagnets 22 being circularly aligned with the permanent magnet poles 14b, 16b as indicated both in FIG. 1 and FIG. 6. Each right-hand pole of electromagnet 20 in the forward direction of rotor rotation is positioned rearwardly by a slight angle of 10 minutes relative to its companion electromagnet 22 in the direction of rotation for an operational purpose to be discussed in detail hereinafter.

With continued reference to FIGS. 1 and 2, the rotor 30 of the exemplary embodiment of the invention is mounted on a suitable shaft 32 that is, in turn, rotatively supported by conventional bearings 34 for rotation within the stator 12 with the exterior periphery of the rotor being closely adjacent to the interior cylindrical surface of the described stator 12, a typical clearance being 0.010 inch. This rotor 30 mounts at regular circumferential intervals of 15° a plurality (24) of like horseshoe magnets 36 whose laterally-spaced poles 36a, 36b are exposed at the outer periphery of the rotor so as to have strong magnetic interaction with the poles of both the permanent magnets 14, 16 and the electromagnets 20, 22 in the stator 12. These magnets 36 are identical with all of their North poles 36a being aligned in one circular plane which is in turn aligned with the adjacent poles 14a, 16a, 20 of the permanent magnets and the electromagnets for interaction therewith and the laterally or axially-displaced South poles 36b of the rotor permanent magnets being in a circumferential plane which is in turn aligned with the poles of the other electromagnets 22 and the laterally-displaced poles 14b, 16b of the permanent horseshoe magnet pairs. Preferably, the rotor permanent magnets 36 are supported in the rotor so as to individually slope approximately 30° rearwardly and outwardly relative to the direction of rotor rotation which, as indicated in FIG. 2, is counterclockwise.

Bearing in mind that opposite magnetic poles attract and like poles repel, it will be clear from a cursory view of the diagrammatic linear presentation of FIG. 6 that certain of the rotor magnets 36 will be urged in the forward rotative direction which is, as previously mentioned, counterclockwise in FIG. 2, and, as indicated by the arrow, is towards the left in FIG. 6 by certain of the permanent magnets 14, 16 in the stator 12 whereas other rotor permanent magnets 36 will experience either attractive or repulsive forces so as to be urged in the opposite rotative direction. In accordance with the present invention, the described electromagnets 20, 22 in the stator 12 are energized at appropriate times to overcome magnetic forces urging the rotor 30 opposite to the forward direction thus providing continued rotation of the rotor in the desired forward direction and the ultimate production of mechanical torque by way of the rotor shaft 32 which can be suitably connected to any output mechanical load in a conventional fashion. More particularly, and as can be readily visualized by reference to FIG. 6, the angular spacing of the electromagnets 20, 22 (72°) differs from the spacing of the rotor magnets 36 (15°) or any multiple thereof, in particular, the multiple of five or 75°. Consequently, each electromagnet 20, 22 is in a different position relative to each generally adjacent rotor magnet 36, thus allowing sequential energization of the electromagnets in appropriate order to advance the rotor.

For the described purpose, one end of the rotor shaft 32 mounts an annular timer disk 40 for rotation therewith and this, in turn, mounts adjacent its periphery a plurality of contacts 42 equal in number to the rotor magnets 36 (i.e. 24) arranged upon rotation of the shaft 32 to provide sequential electrical connection from a suitable direct current source 44 through a rotary ball contactor 46 to ten lead connectors 48 for the ten electromagnets 20, 22. More particularly, the contacts 42 on the timer disk 40 each has a circumferential extent which is correlated with the circumferential extent of the electromagnet pole pieces and the ten lead connectors 48 are circumferentially positioned to sequentially energize the electromagnets. Specifically, signal contact is made with respective electromagnet lead connector 48 precisely at the position where a rotor magnet pole 36a has centered with the lead (South) pole of a permanent stator magnet pole 14a immediately in advance thereof in the direction of rotor rotation. Thus, the top electromagnet 20 as indicated at A at the left in FIG. 6 is about ready to be energized thus to exert an attractive force on the adjacent North pole 36a of the rotor magnet to overcome the locking magnetic attraction experienced by the rotor magnet North pole immediately in advance thereof which lies opposite the leading South pole 14a of the permanent magnet on the stator 12. The top electromagnet 20 continues to be energized through the attracting position indicated at position B at the right of FIG. 6 and until the North pole 36a of a rotor magnet lies opposite the pole of the energized electromagnet as indicated at position C, at which time contact on the timer disk 40 is lost and this electromagnet 20 is accordingly de-energized. Simultaneously with the de-energization of the upper electromagnet 20, its companion electromagnet 22 which is adjacent the South pole 14b of the permanent magnet on the rotor 30 is now energized. However, since this electromagnet 22 is angularly displaced by 10 minutes, the repulsive force between the South pole of the electromagnet and the adjacent South pole 14b of the rotor permanent magnet creates a repulsive force again tending to move the entire rotor to the left as viewed in FIG. 6. Such repelling action continues until the South pole 14b of the permanent magnet extends beyond the energized South pole of the electromagnet 22 at which time both the North and South poles of the preceding permanent magnets 36 on the rotor are beyond the corresponding North and South poles of the stator permanent magnets 14, 16 whereat the latter will continue to act in a repelling action to continue the advance of the rotor in the desired forward direction or to the left as shown in FIG. 6. Thus, in summary it will be seen that the electromagnets 20, 22 are cyclically activated to overcome any forces of the stator permanent magnets 14, 16 which tend to retard rotor rotation or move the rotor 30 in the direction opposite to the desired forward direction, and thereafter the electromagnets 20, 22 are de-energized to allow the permanent magnets 14, 16 to act in a fashion to continue action of magnetic forces so as to advance the rotor 30 in the desired forward direction.

While the precise power requirements for any particular motor will obviously vary, it is preferred that the exterior source 44 of the D.C. potential be at a rather low value (e.g. 12 volts) where it is delivered to the timer disk 40 and associated contacts but thereafter be fed to a suitable voltage amplifier 50 so that appropriate excitation of the electromagnets 20, 22 in the timed-cycle relation will be sufficient to overcome any retarding action of the permanent magnets 14, 16 of the stator.

Additionally, as indicated in FIG. 1, a switch 52 and a rheostat 54 are preferably connected in the circuit to the exterior direct current source 44, the switch 52 enabling the motor to be turned on or off and the rheostat 54 controlling the voltage applied to the electromagnets 20, 22 to in turn provide for variable speed of the motor.

Due to the combined application of forces to the rotor 30 by both permanent magnets and electromagnets, the overall motor efficiency is very high as compared to prior art units and can be extended by utilization of the principles of superconductivity wherein, as is well known in the field of physics, lowering of the temperature of electrical conductors and magnets increases their effectiveness through lowering of resistance losses. By way of example, in the present instance, and as best shown in FIGS. 1 and 2, an exterior channel 60 is provided around the stator 12 enabling the passage of super-cooled fluid therethrough, thus to reduce the temperature of motor operation and achieve the desired superconductive effects which in and of themselves form no part of the present invention, although in the combination the ultimate in motor efficiency is thereby achieved.

It is obvious that many modifications in the structure as described can be made within the spirit of the invention. For example, fewer or more magnets can be utilized and, in particular, a group of units as specifically described hereinabove can be placed in side-by-side relation on a common output shaft to multiply the total torque obtainable from a given unit. The described stator and rotor arrangements allow such side-by-side utilization of identical units without substantial redesign or modification and, of course, are to be encompassed within the general spirit of the invention. Accordingly, with these and other obvious modifications in mind, it is to be specifically noted that the foregoing description of one embodiment of the invention is not to be considered in a limiting sense and the actual scope of the invention is to be indicated only by reference to the appended claims.

What is claimed is:

1. An electromagnetic motor which comprises
   a rotor having a plurality of permanent magnets at regularly spaced positions on its periphery,
   a stator closely encompassing said rotor and mounting a plurality of permanent magnets in predetermined positions to provide cyclical attraction and repulsion forces on said rotor magnets,
   said stator also mounting a plurality of electromagnets in predetermined positions to provide attraction and repulsion forces on said rotor magnets, and
   means for periodically energizing said electromagnets to generate forces on said rotor to propel the same in a forward direction when the forces of said stator permanent magnets on said rotor magnets urge said rotor in a backward direction,
   said rotor permanent magnets having identical horseshoe magnets similarly mounted on said rotor whereby the North poles of said magnets are circularly aligned around said rotor periphery and the South poles of said magnets are also circularly aligned,
   said stator permanent magnets being composed of adjacent pairs of horseshoe magnets whose poles are of opposite polarity and are circularly aligned with the poles of said rotor permanent magnets,
   said electromagnets having like poles when energized and consisting of first and second laterally-spaced sets, each aligned circularly with said rotor and stator permanent magnet poles, and
   said electromagnets of the first set which attract the rotor magnets when energized being spaced forwardly a small amount substantially less than the dimension of one pole in the direction of rotor rotation relative to said electromagnets of the second set which repulse said rotor permanent magnets when energized.

2. An electromagnetic motor according to claim 1 wherein
   said poles of said stator magnet pair are offset in the direction of rotor rotation a distance equivalent to the dimension of one pole in such rotative direction.

3. An electromagnetic motor according to claim 1 wherein
   the angular spacing of said stator electromagnets differs from the angular spacing of said rotor magnets or any multiple thereof.

4. An electromagnetic motor according to claim 1 wherein
   said rotor mounts 24 permanent magnets at angular intervals of 15°, and
   said stator mounts said permanent magnets in 10 pairs at intervals of 36°, and said electromagnets in 5 pairs at intervals of 72°.

5. An electromagnetic motor according to claim 1 wherein
   said electromagnet energizing means energizes said electromagnets in predetermined sequence.

* * * * *